US 6,669,377 B2
Dec. 30, 2003

(12) United States Patent
Barnes et al.

(54) FIBER OPTIC CONNECTOR AND AN ASSOCIATED PIN RETAINER

(75) Inventors: Brandon A. Barnes, Ft. Worth, TX (US); Michael deJong, Ft. Worth, TX (US); Sean M. Kerr, N. Richland Hills, TX (US); Daniel Leyva, Jr., Saginaw, TX (US); Susan E. Rinehart, Keller, TX (US); Scott E. Semmler, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 177 days.

(21) Appl. No.: 09/878,566

(22) Filed: Jun. 11, 2001

(65) Prior Publication Data

US 2002/0186932 A1 Dec. 12, 2002

(51) Int. Cl.[7] .............................. G02B 6/36; G02B 6/38
(52) U.S. Cl. ........................ 385/78; 385/53; 385/55; 385/76; 385/71; 385/72
(58) Field of Search ............................. 385/53, 55, 76, 385/77, 78, 70, 71, 72

(56) References Cited

U.S. PATENT DOCUMENTS

| | | | |
|---|---|---|---|
| 4,818,059 A | | 4/1989 | Kakii et al. ............... 350/96.21 |
| 4,830,456 A | | 5/1989 | Kakii et al. ................ 350/96.2 |
| 5,214,730 A | | 5/1993 | Nagasawa et al. ............ 385/59 |
| 5,469,522 A | | 11/1995 | Fan ............................ 385/98 |
| 5,548,677 A | * | 8/1996 | Kakii et al. ................... 385/92 |
| 5,619,604 A | * | 4/1997 | Shiflett et al. ................ 385/59 |
| 5,926,596 A | | 7/1999 | Edwards et al. .............. 385/78 |
| 6,076,975 A | * | 6/2000 | Roth ........................... 385/76 |
| 6,168,317 B1 | * | 1/2001 | Shahid ........................ 385/71 |
| 6,173,097 B1 | | 1/2001 | Throckmorton et al. ...... 385/59 |
| 6,200,040 B1 | * | 3/2001 | Edwards et al. .............. 385/78 |
| 6,464,408 B1 | * | 10/2002 | Nolan ......................... 385/87 |
| 6,497,516 B1 | * | 12/2002 | Toyooka et al. .............. 385/78 |
| 6,565,265 B2 | * | 5/2003 | Ohtsuka et al. .............. 385/78 |
| 2001/0007603 A1 | * | 7/2001 | Sakurai et al. ................ 385/60 |
| 2001/0036341 A1 | * | 11/2001 | Ohtsuka et al. .............. 385/78 |

FOREIGN PATENT DOCUMENTS

| | | | |
|---|---|---|---|
| EP | 0271721 A2 | 11/1987 | ............ G02B/6/38 |
| EP | 0800100 A1 | 10/1997 | ............ G02B/6/38 |
| EP | 0973051 A1 | 1/2000 | ............ G02B/6/38 |
| EP | 1020745 A2 | 7/2000 | ............ G02B/6/38 |
| EP | 1054277 A2 | 11/2000 | ............ G02B/6/38 |
| EP | 1092997 A1 | 4/2001 | ............ G02B/6/38 |
| JP | 6-34845 | 2/1994 | ............ G02B/6/36 |
| JP | 06034845 | * 2/1994 | ............ G02B/6/36 |

OTHER PUBLICATIONS

Patent Abstract of Japan, JP63249816, Oct. 17, 1988.

(List continued on next page.)

*Primary Examiner*—John D. Lee
*Assistant Examiner*—Daniel Valencia

(57) ABSTRACT

A fiber optic connector including a ferrule that is compatible with a mini-MT ferrule and an E-ferrule and, if sized properly, an MT ferrule is provided. Additionally, a guide pin retention mechanism is provided that permits guide pins to be inserted in the field following assembly of the connector and polishing of the front face of the ferrule. The connector includes a ferrule having a shank and a first shoulder portion proximate one end of the shank. The first shoulder portion has a cross-sectional profile that is larger than the shank. The ferrule may also include a second shoulder portion proximate the first shoulder portion that is smaller in lateral cross-section than the first shoulder portion. The connector can also include a pin retainer for engaging guide pins that extend along the second shoulder portion.

37 Claims, 8 Drawing Sheets

OTHER PUBLICATIONS

Patent Abstract of Japan, JP62023011, Jan. 31, 1987.
Patent Abstract of Japan, JP61147209, Jul. 4, 1986.
Patent Abstract of Japan, JP2109006, Apr. 20, 1990.
Patent Abstract of Japan, 2–256009(A), Oct. 16, 1990.
Patent Abstract of Japan, 63239408A, Oct. 5, 1988.
Patent Abstract of Japan, 3–27009(A), Feb. 5, 1991.
Patent Abstract of Japan, 2–297509(A), Dec. 10, 1990
Patent Abstract of Japan, 2–297508(A), Dec. 10, 1990.
Patent Abstract of Japan, 2–297507(A), Dec. 10, 1990.
Patent Abstract of Japan,2–256008(A), Oct. 16, 1990.
Patent Abstract of Japan, 2–251921 (A), Oct. 9, 1990.
Patent Abstract of Japan,2–251920(A), Oct. 9, 1990.
Patent Abstract of Japan, 2–251919(A), Oct. 9, 1990.
Patent Abstract of Japan, 2–251918(A), Oct. 9, 1990.
Patent Abstract of Japan, 1–319005(A), Dec. 25, 1989.
Patent Abstract of Japan, 1–293309(A), Nov. 27, 1989.
Patent Abstract of Japan, 1–230006(A), Sep. 13, 1989.
Patent Abstract of Japan, 1–219806(A), Sep. 1, 1998.
Patent Abstract of Japan, 1–180506(A), Jul. 18, 1989.

* cited by examiner

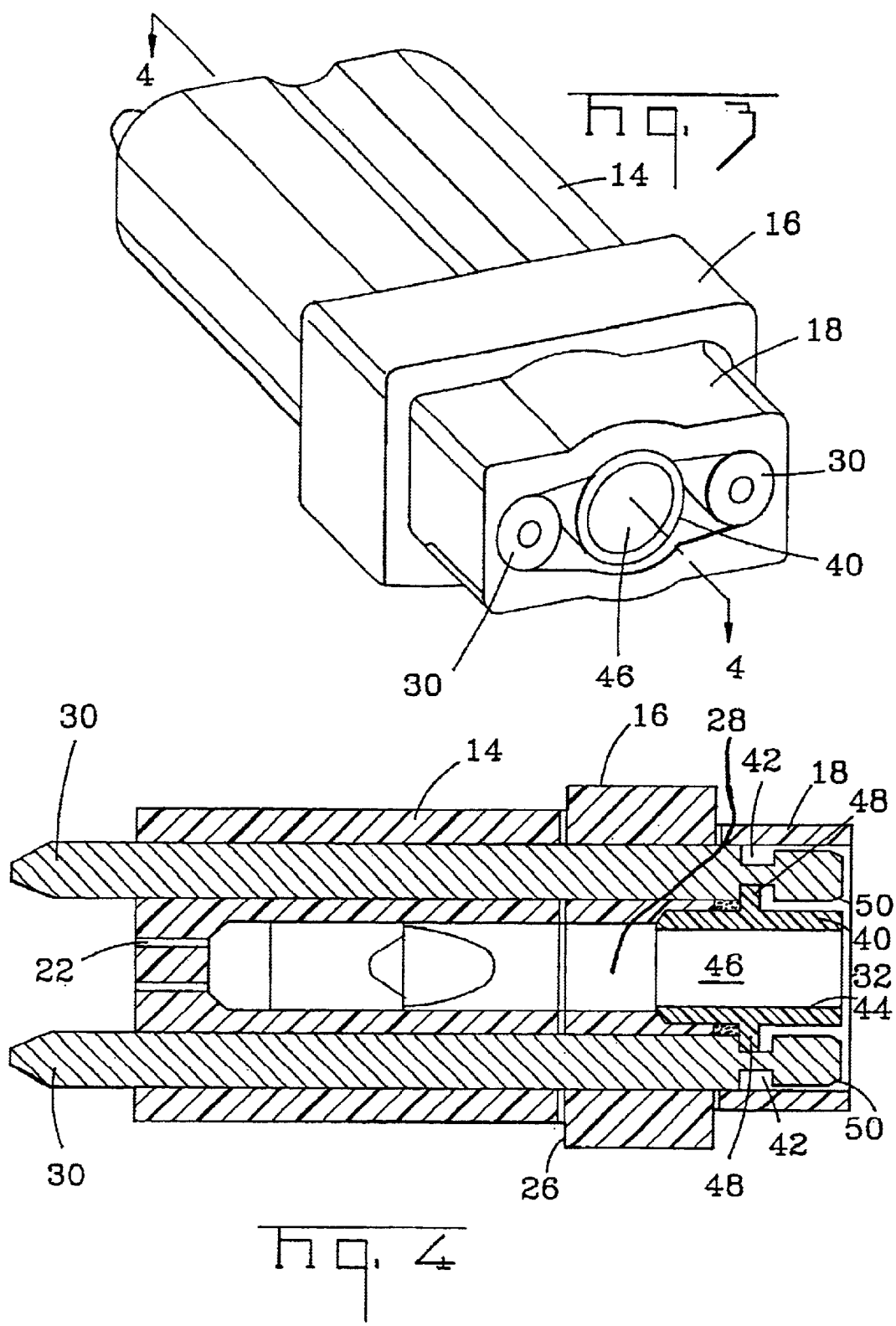

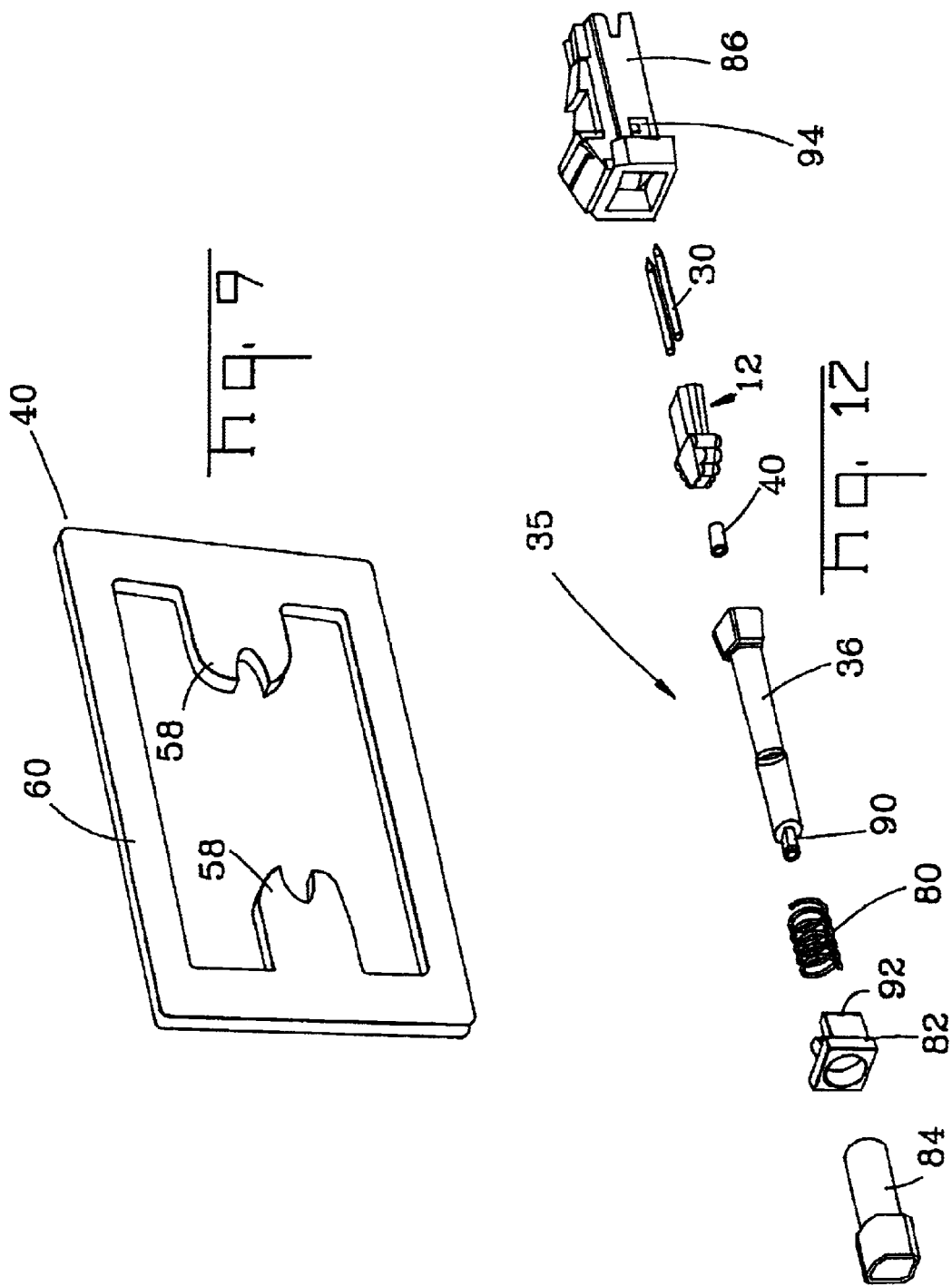

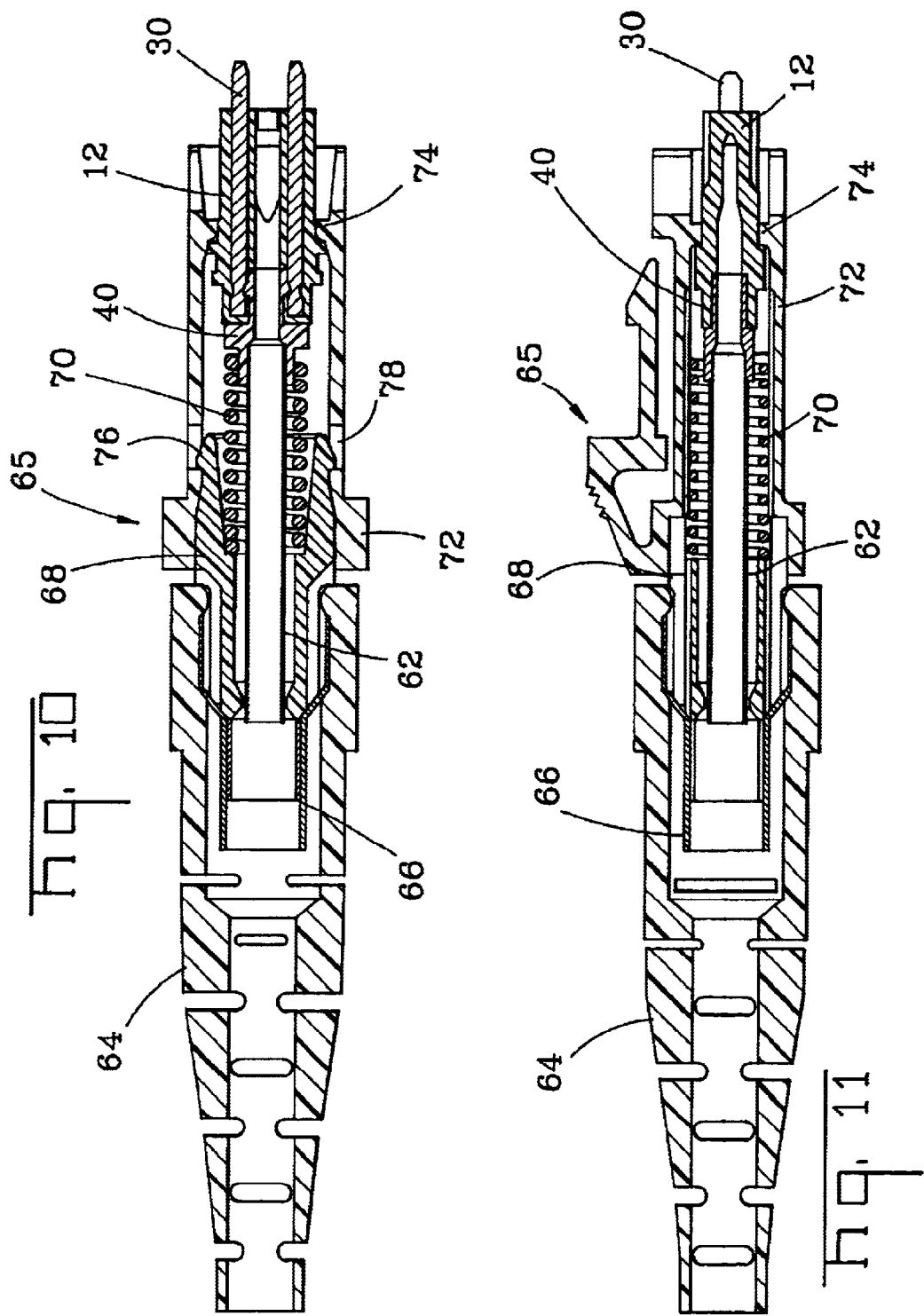

FIBER OPTIC CONNECTOR AND AN ASSOCIATED PIN RETAINER

FIELD OF THE INVENTION

The present invention relates generally to fiber optic connectors and associated guide pin retention mechanisms and, more particularly, to a fiber optic connector having a ferrule that is compatible with conventional connectors and a variety of ferrules, as well as an improved guide pin retention mechanism that permits guide pins to be inserted into the fiber optic connector following assembly of the fiber optic connector and the polishing of the front face of the ferrule.

BACKGROUND OF THE INVENTION

Multi-fiber cables or ribbons are being increasingly employed in a wide variety of applications. As such, several standard multi-fiber connectors have been developed and are commonly utilized. Perhaps the most common multi-fiber connector is the MT-RJ connector having a rectangularly-shaped mini-MT ferrule that was developed by Nippon Telegraph & Telephone Corporation of Tokyo, Japan. An MT-RJ connector is commonly assembled utilizing a heat cure epoxy process. In this regard, epoxy is introduced via a window defined by the mini MT ferrule into the bores defined by the MT ferrule through which the end portions of the optical fibers extend. The epoxy is heat cured to secure the end portions of the optical fibers within the mini MT ferrule. The front face of the ferrule is then polished, and the remainder of the components of the MT-RJ connector are assembled about the ferrule.

With respect to the assembly of the other components of the MT-RJ connector, the mini-MT ferrule is mounted within a connector housing such that the front face of the ferrule is exposed. In this regard, the mini-MT ferrule includes a lengthwise extending shank and an enlarged shoulder portion proximate the rearward end of the shank. The shoulder portion is larger in lateral cross-section than the shank, thereby defining a shoulder. Upon insertion of the mini-MT ferrule into the connector housing during the assembly of an MT-RJ connector, the shoulder of the mini-MT ferrule is engaged by an inwardly projecting ledge within the connector housing such that the front face of the ferrule extends outwardly beyond the connector housing while the enlarged shoulder portion of the ferrule is retained within the connector housing. Thus, a mini-MT ferrule must include an enlarged shoulder portion to define a shoulder for engaging the connector housing.

Another common multi-fiber connector is the MT-RJ UniCam® connector having a modified MT ferrule referred to as the E-ferrule. The UniCam® connector can be mounted upon one or more optical fibers by means of a mechanical splice that permits the UniCam® connector to be field installable. In this regard, fiber stubs are typically mounted within respective bores defined by the E-ferrule. The fiber stubs are secured within the ferrule by means of an epoxy, and the front face of the ferrule is then polished. While the mounting of the E-ferrule upon one or more fiber stubs and the polishing of the front face of the ferrule are typically performed at the factory, the UniCam® connector can be spliced onto one or more field fibers in the field. In this regard, the UniCam® connector also includes a splice component holder that engages the rearward end of the ferrule. The splice component holder defines a lengthwise extending passageway that is sized and shaped to receive a pair of splice components. The splice components define lengthwise extending grooves for receiving end portions of the optical fiber stubs and the field fibers. In particular, the fiber stubs upon which the ferrule is mounted extend into the grooves defined by the splice components from one end, while the field fibers are inserted into the grooves defined by the splice components from the other end. By rotating a cam member relative to the splice component holder, the splice components are forced together, thereby mechanically splicing the field fibers and the fiber stubs. See, for example, U.S. Pat. No. 6,173,097 by Rodney A. Throckmorton, et al. entitled Field Installable Multifiber Connector, the contents of which are incorporated herein by reference.

Since the E-ferrule must be engaged by the splice component holder in order to ensure alignment of the fiber stubs and the field fibers, the E-ferrule generally has a different design than the MT ferrule utilized by MT-RJ connectors. Rather than an enlarged shoulder, the E-ferrule has a reduced shoulder portion. As such, the portion of the passageway defined by the splice component holder proximate its forward end is sized and shaped to snugly receive the rearward end of the E-ferrule such that the ferrule and the splice component holder are maintained in an aligned relationship.

It would be desirable to provide a common ferrule that is compatible with and capable of replacing both the mini-MT ferrule and the E-ferrule. By providing a common ferrule, the number of different ferrules that would have to be manufactured would be substantially reduced, thereby streamlining manufacturing operations. In addition, the number of different ferrules that would have to be maintained in inventory and carried by field technicians would also be advantageously reduced. Due to the substantial differences in functionality and design of the various ferrules, however, the design of a universal ferrule has been heretofore unsuccessful.

In addition to the MT-RJ connector and the MT-RJ Unicam® connector, another common multi-fiber connector is the MTP or MPO connector (hereinafter referenced as the MTP connector). The MTP connector has a larger version of the MT ferrule than the MT-RJ connector and can therefore be mounted upon the end portions of a larger number of optical fibers than the MT-RJ connector. As with the MT-RJ connector, however, an MTP connector is commonly assembled by a heat cure epoxy process. In this regard, epoxy is introduced via a window defined by the MT ferrule into the bores defined by the MT ferrule through which the end portions of the optical fibers extend. The epoxy is heat cured to secure the end portions of the optical fibers within the MT ferrule. The front face of the ferrule is then polished, and the remainder of the components of the MTP connector are assembled about the ferrule.

Regardless of the type of multi-fiber connector, the multi-fiber connector should be capable of receiving guide pins in order to facilitate the alignment of the multi-fiber connector with another connector or with an interface device. The alignment of the connector, in turn, permits alignment of the optical fibers upon which the connector is mounted. Depending upon the type of multi-fiber connector, different guide pin retention mechanisms have been developed.

With respect to the MT-RJ and MTP connectors, for example, two different configurations have been developed, namely, a male configuration that includes a pair of guide pins extending outwardly beyond the front face of the MT ferrule and a female configuration that does not include guide pins but that defines a pair of guide pin holes. A pair of these connectors are therefore mated by inserting the guide pins of a male connector into the guide pin holes of a female connector.

In order to retain the guide pins in the male configuration of the MT-RJ or MTP connector, each connector generally includes a pin keeper. During the assembly process, the guide pins are engaged by the pin keeper prior to the insertion of the guide pins into a ferrule. The pin keeper is then positioned immediately rearward of the MT ferrule such that the guide pins inserted through the guide pin holes defined by the MT ferrule from the rear of the MT ferrule so as to protrude outwardly beyond the front face of the MT ferrule. Thus, the guide pins of the male configuration of an MT-RJ or MTP connector must be inserted during the factory assembly process and cannot be inserted in the field once the remainder of the connector has been assembled. As a result, the female configuration of an MT-RJ or MTP connector cannot be converted to a male configuration in the field by merely inserting guide pins through the guide pins holes defined by the MT ferrule since the guide pins will not be appropriately grasped by the pin keeper. Field technicians must therefore maintain an inventory of MT-RJ and/or MTP connectors in both the male configuration and the female configuration since the connectors cannot be converted or otherwise altered in the field.

MT-RJ and MTP connectors also cannot generally be preassembled. Instead, the MT-RJ and MTP connectors must be assembled once the MT ferrule has been mounted upon the optical fibers. In this regard, an MT-RJ and/or an MTP connector cannot be assembled until after the front face of the MT ferrule has been polished since the guide pins of the male configuration of the connector would otherwise protrude beyond the front face of the ferrule and prevent polishing. Additionally, the MT ferrule is typically secured to the optical fibers by means of epoxy injected through a window defined by MT ferrule, thereby also preventing preassembly since the window must remain accessible until the optical fibers have been secured within the MT ferrule. Thus, the MT ferrule is mounted upon a plurality of optical fibers, the front face of the MT ferrule is polished and the remainder of the connector is thereafter assembled.

In contrast to the MT-RJ connector, a UniCam® connector with an E-ferrule permits the guide pins to be inserted after the front face of the E-ferrule has been polished. In this regard, guide pins can be inserted into corresponding guide pin holes. The guide pins are then glued to the ferrule by means of epoxy injected via the pair of relatively small windows. Unfortunately, the process of gluing the guide pins to the ferrule is a time-consuming operation and must be carefully performed to prevent any epoxy from reaching the front face of the ferrule.

Accordingly while various guide pin retention mechanisms have been developed for multi-fiber connectors, an improved guide pin retention mechanism is desired. In this regard, it would be desirable for a multi-fiber connector to be capable of being converted from a female configuration to a male configuration in the field in order to further reduce the number of different connectors that must be carried by field technicians. As such, it would be desirable for a multi-fiber connector to permit guide pins to be inserted from the front face of the ferrule and engaged by a guide pin retention mechanism following assembly of the multi-fiber connector and polishing of the front face of the ferrule. Additionally, it would be desirable for a multi-fiber connector to include a guide pin retention mechanism that permits guide pins to be inserted and engaged without the use of epoxy or the like.

SUMMARY OF THE INVENTION

A fiber optic connector including a multi-fiber ferrule that is compatible with both a mini-MT ferrule and an E-ferrule is therefore provided according to the present invention. Since the multi-fiber ferrule of the present invention is compatible with both types of connectors, the multi-fiber ferrule should reduce the number of different multi-fiber ferrules that must be manufactured and maintained in inventory. Additionally, an improved guide pin retention mechanism is provided by the present invention that is suitable for a variety of different ferrules that permits guide pins to be inserted in the field following assembly of the connector and polishing of the front face of the ferrule, without requiring that the guide pins be adhered to the ferrule by means of epoxy or the like. Thus, a field technician need not carry a stock of both male connectors and female connectors, but can instead carry female connectors and a supply of guide pins in order to convert the female connectors into male connectors, as needed. In order to further facilitate preassembly of the connector, the multi-fiber ferrule may be windowless and the fiber optic connector may be designed to permit epoxy to otherwise be injected into the ferrule following preassembly of the connector without requiring access to a window in the ferrule.

According to one advantageous embodiment, a fiber optic connector is provided that includes a ferrule that is compatible with at least the mini-MT ferrule and the E-ferrule. The ferrule includes a shank defining at least one lengthwise extending bore for receiving an end portion of a respective optical fiber, and a first shoulder portion proximate one end of the shank. The first shoulder portion has a cross-sectional profile that is larger than the shank. As such, the ferrule defines a shoulder for engaging the inwardly projecting ledge of the connector housing of an MT-RJ connector such that the ferrule is compatible with a mini-MT ferrule.

In one advantageous embodiment, the multi-fiber ferrule of the fiber optic connector not only includes the shank and the first shoulder portion, but also a second shoulder portion proximate the first shoulder portion and disposed opposite the shank relative to the first shoulder portion. The second shoulder portion is smaller in lateral cross-section than the first shoulder portion, and generally smaller in lateral cross-section than the shank.

The fiber optic connector of this embodiment can also serve as a UniCam® connector and, as such, also includes a splice component holder defining a passageway extending lengthwise between opposed first and second ends. The fiber optic connector can also include a plurality of splice components disposed within the passageway defined by the splice component holder for facilitating the mechanical splice of the optical fibers upon which the ferrule is mounted, i.e., the fiber stubs, and a number of other optical fibers, i.e., the field fibers. According to this embodiment, the splice component holder can be designed such that the portion of the passageway proximate the first end of the splice component holder is sized and shaped to snugly receive the second shoulder portion of the ferrule, thereby maintaining the splice component holder and the multi-fiber ferrule in an aligned relationship.

In an alternative embodiment, the ferrule includes the first shoulder portion, but does not include the second shoulder portion. In this embodiment, the first end of the splice component holder engages the first shoulder portion of the ferrule such that the splice component holder and the ferrule are maintained in an aligned relationship as required by a UniCam® connector. Advantageously, the splice component holder engages the first shoulder portion such that the portions of the splice component holder and the first shoulder portion that are engaged have a combined cross-sectional profile that is no larger than the cross-sectional profile of the first shoulder portion. Thus, the ferrule and splice component holder of this embodiment can be disposed within a conventional connector housing, such as the housing of an MT-RJ connector or a UniCam® connector.

In order to permit the splice component holder to engage the first shoulder portion of the ferrule, the first shoulder portion of the ferrule can define an opening in communication with the at least one lengthwise extending bore defined by the shank. In this embodiment, the first end of the splice component holder is sized and shaped to be snugly received within the opening defined by the first shoulder portion of the ferrule. Alternatively, the first shoulder portion of the ferrule can define a plurality of lengthwise extending channels. In this alternative embodiment, the first end of the splice component holder can also include a plurality of lengthwise extending tabs for engaging respective channels of the first shoulder portion, thereby maintaining the spliced component holder and the ferrule in an aligned relationship. In any of the foregoing embodiments, however, the multi-fiber ferrule is preferably compatible with a number of conventional ferrules including the mini-MT ferrule and the E-ferrule and, if sized properly, with the MT ferrule.

Regardless of the type of ferrule housed within the fiber optic connector, the fiber optic connector of the present invention also preferably includes a plurality of guide pins. As such, the shank preferably defines a plurality of lengthwise extending holes opening through the front face for receiving respective guide pins. Additionally, the first shoulder portion preferably defines a plurality of lengthwise extending holes in communication with the holes defined by the shank for receiving respective guide pins. However, the second shoulder portion preferably does not define complete holes for receiving respective guide pins. Instead, the plurality of guide pins preferably extend lengthwise beyond the first shoulder portion and along the second shoulder portion. As such, the fiber optic connector can also include a pin retainer for engaging the portions of the plurality of guide pins that extend along the second shoulder portion.

Although the second shoulder portion does not define complete holes for receiving respective guide pins, the second shoulder portion of one advantageous embodiment defines a plurality of lengthwise extending grooves in alignment with the holes defined by the shank and the first shoulder portion for receiving respective guide pins. The grooves defined by the second shoulder portion can be configured in different manners depending upon the design of the ferrule. For example, the plurality of grooves defined by the second shoulder portion can open into an internal opening defined by the second shoulder portion through which the end portions of the optical fibers extend. Alternatively, the plurality of grooves defined by the second shoulder portion can open through an exterior surface of the second shoulder portion.

In embodiments in which the guide pins extend through the internal opening defined by the second shoulder portion, the pin retainer preferably engages the guide pins within the ferrule. In this regard, the pin retainer of one advantageous embodiment includes a body portion extending lengthwise between opposed ends and defining a passageway opening through each of the opposed ends. The body portion is sized to be at least partially and, more preferably, completely received within an internal opening defined by the ferrule. The pin retainer of this embodiment also includes at least one and, more typically, a plurality of engagement members extending laterally outward from the body portion for engaging respective guide pins within the ferrule. For example, the pin retainer typically includes a pair of engagement members extending laterally outward from opposite sides of the body portion. Typically, the plurality engagement members extend laterally outward from a midpoint of the body portion such that the pin retainer is symmetrical about an imaginary plane passing through the plurality of engagement members.

The guide pins typically include circumferential grooves. As such, the pin retainer is preferably designed such that the engagement members can snap within the groove of a respective guide pin as the guide pin is inserted through holes defined by the shank and the first shoulder portion of the ferrule. In order to facilitate the insertion of the engagement members into the circumferential grooves defined by the guide pins, each engagement member can taper laterally outward, if so desired. As such, the guide pins can be advantageously inserted following the assembly of the fiber optic connector and polishing of the front face of the ferrule.

Since the pin retainer is sized and shaped to fit within the ferrule, the combination of the ferrule and the pin retainer is no larger than the ferrule by itself. As such, the ferrule and the pin retainer can be assembled within a conventional connector housing without restricting or otherwise limiting the length or the lateral cross-sectional dimensions of the ferrule.

In embodiments of the fiber optic connector in which the plurality of guide pins extend along an exterior surface of the second shoulder portion, the fiber optic connector can include other types of pin retainers for engaging the guide pins as the guide pins are inserted through the guide pin holes following the assembly of the connector. For example, the fiber optic connector can include a pin retainer defining an opening sized and shaped to receive the second shoulder portion and end portions of the guide pins such that the second shoulder portion can be inserted into the opening defined by the pin retainer. The guide pins will therefore be secured between the pin retainer and the second shoulder portion. In this embodiment, the pin retainer typically includes a plurality of tabs extending into the opening defined by the pin retainer for engaging the circumferential grooves defined by the respective guide pins. In one embodiment, the pin retainer includes a plurality of clips for engaging respective guide pins proximate the second shoulder portion. In this embodiment, the pin retainer can also include a frame connecting the plurality of clips and defining an opening for receiving a second shoulder portion. In both embodiments, however, the pin retainer is preferably no larger in lateral cross-section than the first shoulder portion such that the resulting combination of the ferrule and the pin retainer can be disposed within a conventional connector housing.

A fiber optic connector is therefore provided that includes a common ferrule compatible with at least the mini-MT ferrule and the E-ferrule. Accordingly, use of the ferrule of the present invention would reduce the number of different types of ferrules that must be manufactured and maintained in inventory. Additionally, the fiber optic connector of the present invention includes an improved guide pin retention mechanism that permits guide pins to be inserted following the preassembly of the connector. Thus, the fiber optic connector of the present invention permits guide pins to be inserted in the field in order to convert a female version of a connector to a male version, thereby further reducing the number of different connectors that must be carried by a field technician. Moreover, the fiber optic connector of the present invention permits the end portions of optical fibers to be inserted into and secured within the ferrule and the front face of the ferrule to be thereafter polished following preassembly of the connector since epoxy no longer need be injected through a window defined by the ferrule. In fact, the ferrule can be windowless. Thus, the fiber optic connector of the present invention can advantageously be preassembled.

BRIEF DESCRIPTION OF THE DRAWINGS

FIG. 3 is a perspective view of the ferrule of FIG. 1 taken from the rearward end of the ferrule following the insertion of a pin retainer and a pair of guide pins.

FIG. 4 is a cross-sectional view of the ferrule, pin retainer and guide pins of FIG. 3 taken along line 4—4.

FIG. 9 is a perspective view of a pin retainer according to another embodiment of the present invention.

FIG. 10 is a top cross-sectional view of a fiber optic connector of one embodiment of the present invention following assembly in a configuration similar to an MT-RJ connector.

FIG. 11 is a side cross-sectional view of the fiber optic connector of FIG. 10.

FIG. 12 is an exploded perspective view of a number of components of a fiber optic connector of another embodiment of the present invention having a configuration similar to a UniCam® connector.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to the present invention, a fiber optic connector is provided that includes a multi-fiber ferrule 12 that is compatible with a number of different types of ferrules. For example, the multi-fiber ferrule 12 of the present invention is preferably compatible with and therefore capable of replacing a mini-MT ferrule and an E-ferrule. Moreover, the multi-fiber ferrule 12 of the present invention may be capable of replacing an MT ferrule if the ferrule is properly sized.

Figure 1:
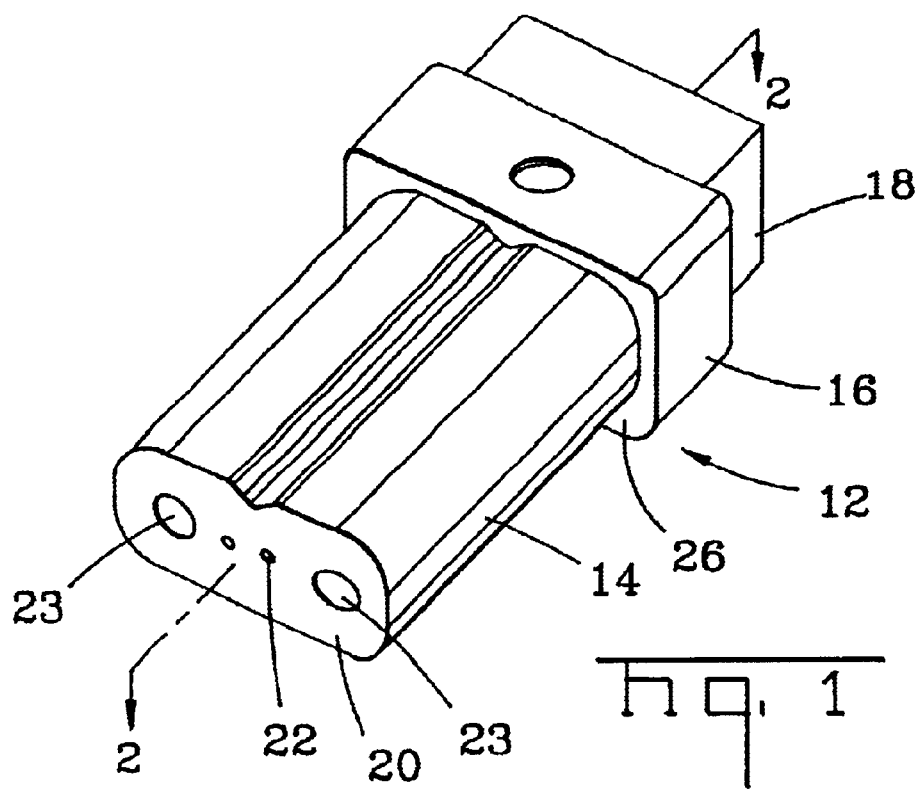
FIG. 1 is a perspective view of a ferrule according to one embodiment of the present invention.

As shown in FIG. 1, the ferrule 12 of one advantageous embodiment includes a shank 14 and first and second shoulder portions 16, 18. The multi-fiber ferrule 12 including the shank 14 and the first and second shoulder portions 16, 18 is preferably a monolithic structure formed of a thermoset epoxy material or a thermoplastic material. The shank 14 extends lengthwise between opposed first and second ends and has a first face 20 proximate the first end. The shank 14 can have a rectangular shape in lateral cross section in order to have the same appearance as a mini-MT ferrule. However, the shank 14 can also have other shapes in lateral cross section including the shape depicted in FIG. 1 in which the shank has a pair of lobes extending in parallel and connected to one another along their length.

The shank 14 defines at least one and, more typically, a plurality of lengthwise extending bores 22. The bores 22 open through the front face 20 of the shank for receiving end portions of respective optical fibers. The shank 14 also defines a plurality of lengthwise extending holes 23. As shown in FIG. 1, the shank 14 typically defines a pair of holes 23. These holes 23 also open through the front face of the shank 14 and are adapted to receive respective guide pins 30 which serve to align the multi-fiber ferrule 12 with another multi-fiber ferrule, an interface device or the like.

The first shoulder portion 16 of the ferrule 12 of FIG. 1 is proximate the second end of the shank 14 and is larger in lateral cross-section than the shank. Although the ferrule 12 can be sized and shaped in different manners without departing from the present invention, the ferrule of one embodiment includes a shank 14 having lateral cross-sectional dimensions of 2.45 mm×4.4 mm and a first shoulder portion 16 with lateral cross-sectional dimensions of 3.0 mm×5.05 mm. In this regard, the peripheral portion of the first shoulder portion 16 that extends laterally outward beyond the shank 14 defines a shoulder 26. As explained in detail below, the shoulder 26 is capable of engaging internal features of a connector housing of an MT-RJ or MTP connector in order to retain the multi-fiber ferrule 12 within the connector housing. As such, the shoulder 26 defined by the multi-fiber ferrule 12 permits the multi-fiber ferrule to be sized so as to be compatible with a mini-MT ferrule and a MT ferrule. As shown in cross section in FIG. 2, the first shoulder portion 16 also defines an internal opening 28 that is in communication with the plurality of bores 22 defined by the shank 14 for receiving end portions of the optical fibers. Additionally, the first shoulder portion 16 typically defines a plurality of holes 24, preferably the same number of holes 23 as the shank 14, such as a pair of holes. In addition, the holes 24 defined by the first shoulder portion 16 are in communication with respective holes 23 defined by the shank 14 in order to receive respective guide pins 30.

The second shoulder portion 18 of the multi-fiber ferrule 12 of FIG. 1 is proximate the first shoulder portion 16 and is disposed opposite the shank 14 relative to the first shoulder portion. As illustrated, the second shoulder portion 18 is smaller in lateral cross-section than the first shoulder portion 16 and may actually be smaller in lateral cross-section than the shank 14. Both the first and second shoulder portions 16, 18 define respective lateral cross-sectional profiles. Typically, the shape of the lateral cross-sectional profiles of the first and second shoulder portions 16, 18 are the same, namely, a substantially rectangular profile having rounded corners. However, the lateral cross-sectional profile of the second shoulder portion 18 has an area that is substantially less than that of the first shoulder portion 16. By way of example, the ferrule 12 of the embodiment described above having a first shoulder portion 16 with lateral cross-sectional dimensions of 3.0 mm×5.05 mm also includes a second shoulder portion 18 having lateral cross-sectional dimensions of 2.0 mm×4.0 mm.

Figure 2:
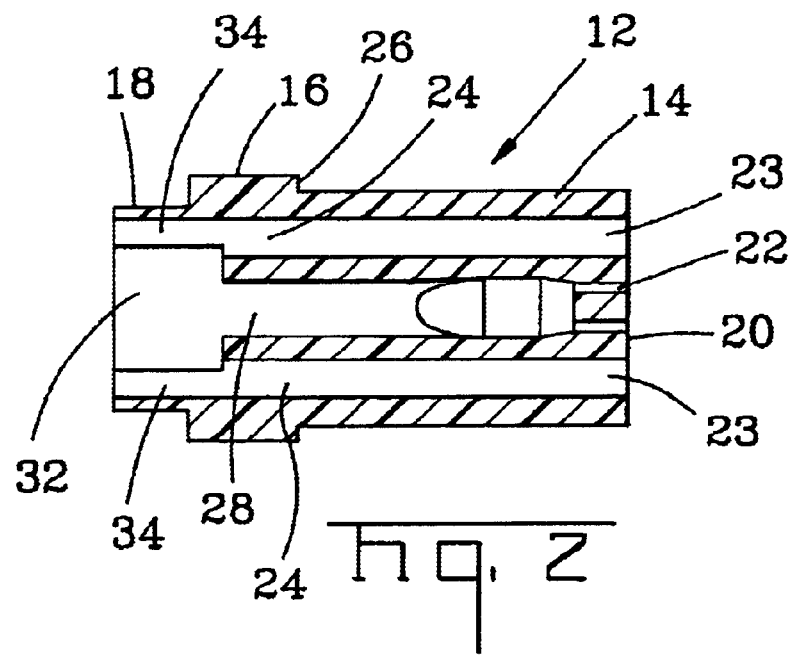
FIG. 2 is a cross-sectional view of the ferrule of FIG. 1 taken along line 2—2.

Like the first shoulder portion 16, the second shoulder portion 18 defines an internal opening 32 in communication with the internal opening 28 defined by the first shoulder portion and the bores 22 defined by the shank 14, as shown in FIG. 2. As such, optical fibers can extend through the internal openings 28, 32 defined by the first and second shoulder portions 16, 18 and through respective bores 22 defined by the shank 14 so as to be exposed at the front face 20 of the shank. Unlike the first shoulder portion 16, however, the second shoulder portion 18 of this embodiment does not define complete holes through which respective guide pins would extend. Instead, the multi-fiber ferrule 12 of this embodiment is designed such that the guide pins 30 exit the respective holes 24 defined by the first shoulder portion 16 and extend along a surface, either the interior or exterior surface, of the second shoulder portion 18. As such, a pin retainer can engage those portions of the guide pins 30 that extend along the second shoulder portion 18 and secure the guide pins relative to the multi-fiber ferrule 12 as explained in more detail below. In the embodiment illustrated in FIG. 2, the holes 24 defined by the first shoulder portion 16 open into the interior opening 32 defined by the second shoulder portion 18. As explained below in conjunction with FIGS. 3 and 4, the guide pins 30 can therefore extend beyond the holes 24 defined by the first shoulder portion 16 and along opposed interior sidewalls that define the interior opening 32 of the second shoulder portion.

In order to maintain the position of the guide pins 30 relative to the multi-fiber ferrule 12, the second shoulder portion 18 can define a plurality of lengthwise extending grooves 34, as shown in FIGS. 2–4. The second shoulder portion preferably defines the same number of grooves 34 as the number of guide pin holes defined by the shank 14 and the first shoulder portion 16, such as a pair of grooves. The grooves 34 defined by the second shoulder portion 18 are in alignment with the holes defined by the first shoulder portion 16 and the shank 14 for receiving respective guide pins 30. As such, in the embodiment in which the holes 24 defined by the first shoulder portion open into the internal opening 32 defined by the second shoulder portion 18, the interior sidewalls of the second shoulder portion preferably define a pair of lengthwise extending grooves 34 in alignment with the holes defined by the first shoulder portion for receiving respective guide pins 30. Each groove 34 is preferably sized and shaped to snugly receive a portion of a respective guide pin 30. The guide pins 30 and the multi-fiber ferrule 12 are also preferably sized such that the guide pins do not protrude rearwardly beyond the second shoulder portion 18 but, instead, terminate alongside the second shoulder portion.

Figure 7:
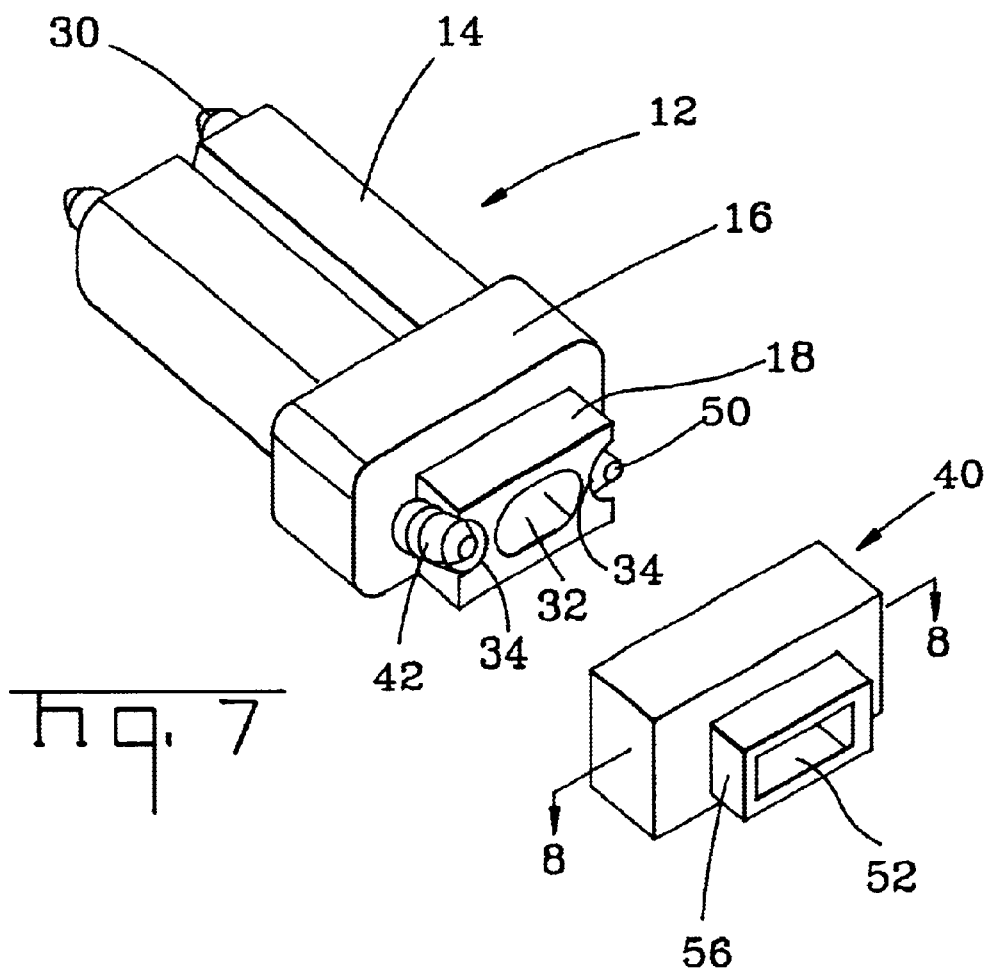
FIG. 7 is a perspective view of a ferrule and a pin retainer according to another embodiment of the present invention.

In an alternative embodiment depicted in FIG. 7 and discussed below, the holes 24 defined by the first shoulder portion 16 open outside of the second shoulder portion 18 such that the guide pins 30 extend along the exterior surface of the second shoulder portion. In this embodiment, the second shoulder portion 18 can again define a plurality of lengthwise extending grooves 34, such as a pair of grooves in alignment with the holes defined by the first shoulder portion 16 and the shank 14 for receiving respective guide pins 30. Since the holes 24 defined by the first shoulder portion 16 open outside of the second shoulder portion 18 in this embodiment, however, the grooves 34 extend lengthwise along the opposed exterior sidewalls of the second shoulder portion. As described above, the guide pins 30 and the multi-fiber ferrule 12 are again preferably sized such that the guide pins do not extend rearwardly beyond the second shoulder portion 18 but, instead, terminate alongside the second shoulder portion. As with the grooves 34 described above, each groove defined by the exterior surface of the second shoulder portion 18 of this embodiment is preferably sized and shaped to snugly receive at least a portion of a respective guide pin 30.

Figure 13:
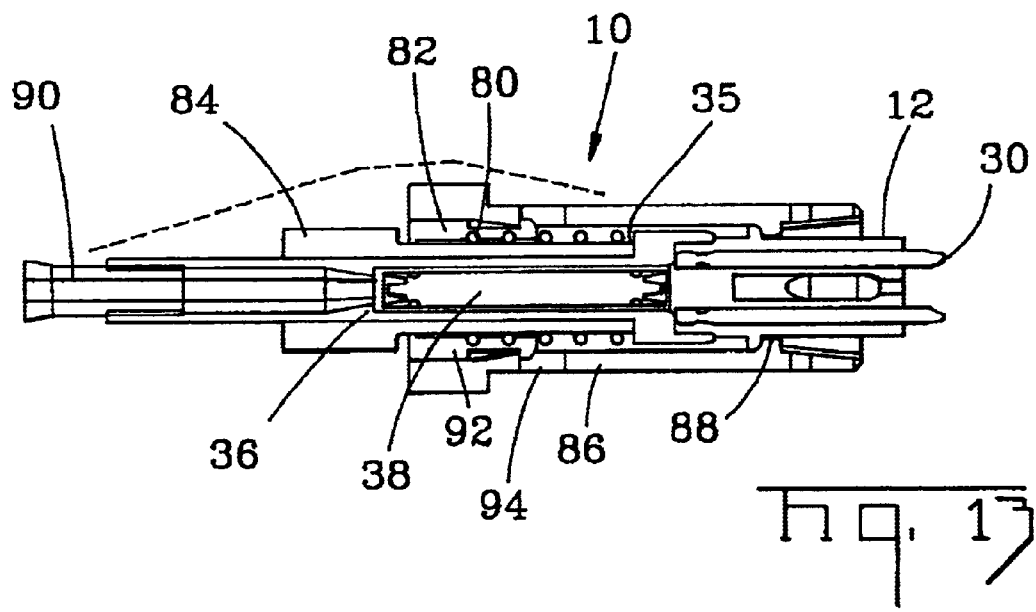
FIG. 13 is a top cross-sectional view of the fiber optic connector of FIG. 12 following assembly.
Figure 14:
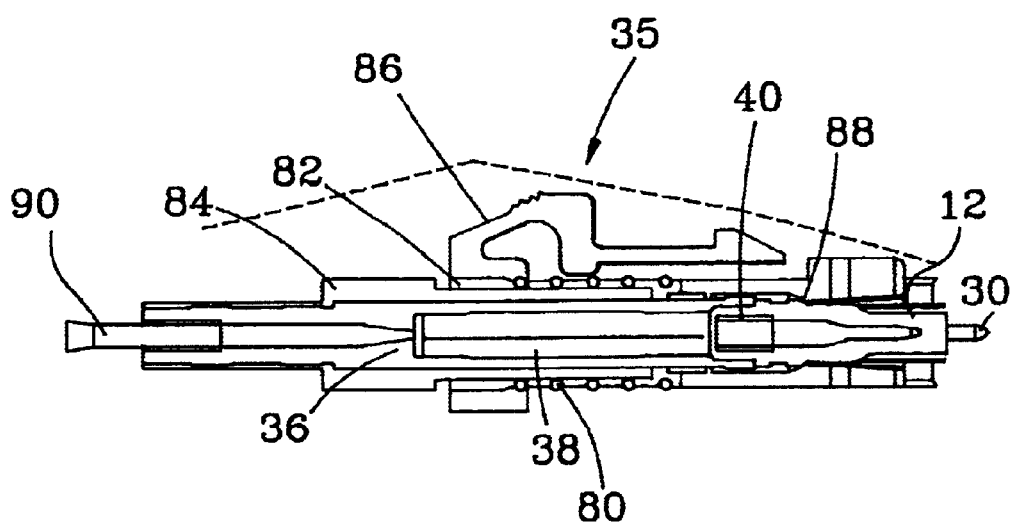
FIG. 14 is a side cross-sectional view of the fiber optic connector of FIGS. 12 and 13.

As described below and as illustrated in FIGS. 12–14, the ferrule 12 of the present invention can serve as an E-ferrule. In this embodiment, the fiber optic connector 35 therefore also includes a splice component holder 36 positioned immediately rearward of the ferrule 12. Among other things, the splice component holder 36 is designed to retain a pair of splice components 38 and to facilitate the actuation of the splice components in order to mechanically splice one or more fiber stubs to respective field fibers.

By incorporating a second shoulder portion 18 that is smaller in lateral cross-section than the first shoulder portion 16, the multi-fiber ferrule 12 of this embodiment permits the splice component holder 36 to engage the second shoulder portion in order to maintain the multi-fiber ferrule and the splice component holder in an aligned relationship. Since the second shoulder portion 18 has a reduced size relative to the first shoulder portion 16, however, the splice component holder 36 can engage the second shoulder portion without causing the resulting combination of the second shoulder portion and the splice component holder to be any larger in lateral cross-sectional size and shape than the first shoulder portion of the multi-fiber ferrule 12. Thus, a multi-fiber ferrule 12 and the splice component holder 36 can be disposed within a traditional connector housing without requiring that the interior cavity defined by the connector housing be any larger than normal. Thus, the ferrule 12 of the present invention is compatible with the E-ferrule of a UniCam® connector.

Regardless of the type of multi-fiber ferrule 12, the fiber optic connector of the present invention preferably includes a plurality of guide pins 30 and a pin retainer 40 for engaging the plurality of guide pins, as depicted in FIGS. 3 and 4. The guide pins 30 and the pin retainer 40 can be formed of various materials, although the guide pins 30 are typically formed of a metal, while the pin retainer 40 is generally formed either of a metal or a plastic. As is known to those skilled in the art, multi-fiber connectors typically include a pair of guide pins 30 and, as described above, the multi-fiber ferrule 12 of the present invention includes a shank 14 and a first shoulder portion 16 that define lengthwise extending holes 23, 24 for snugly receiving respective guide pins. According to preferred embodiments of the present invention, the pin retainer 40 is designed to securely engage the guide pins 30 without being positioned rearward of the multi-fiber ferrule 12 and without being any larger in lateral cross-sectional size and shape than the first shoulder portion 16. Since the pin retainer 40 will preferably not be positioned rearward of the multi-fiber ferrule, the multi-fiber ferrule 12 can be longer than conventional MT ferrules. Additionally, since the pin retainer 40 is no larger in lateral cross section than the first shoulder portion 16, the pin retainer does not require the internal cavity defined by the connector housing to be enlarged. Instead, the fiber optic connector of the present invention can include a traditional connector housing having an internal cavity of conventional size.

The pin retainer 40 is designed to engage the portions of the plurality of guide pins 30 that extend along the second shoulder portion 18. In this regard, the guide pins 30 generally define a circumferential groove 42 proximate the rearward end of the guide pins, namely, within that portion of the guide pins that extend along the second shoulder portion 18. As such, the pin retainer 40 is designed to engage the grooves 42 defined by the respective guide pins, thereby securely affixing the guide pins in position relative to the multi-fiber ferrule 12.

Figure 5:
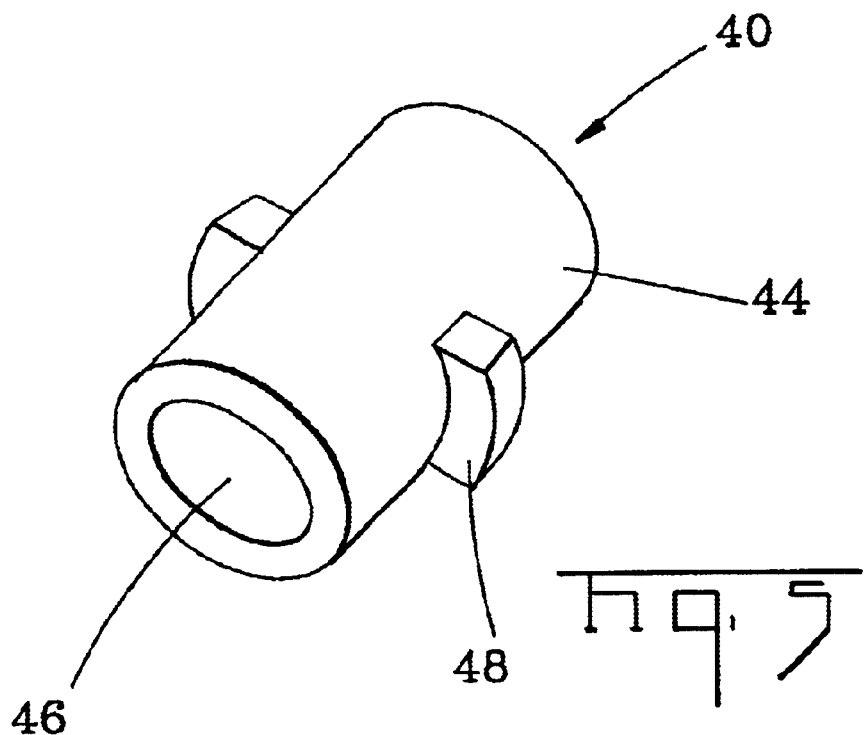
FIG. 5 is a perspective view of a pin retainer according to one embodiment of the present invention.

In the embodiment in which the guide pins 30 extend through the internal opening 32 defined by the second shoulder portion 18, the pin retainer 40 is sized and shaped to fit within at least the internal opening of the second shoulder portion and, more typically, the internal openings defined by the first and second shoulder portions. See FIGS. 3 and 4. As shown in FIG. 5, the pin retainer 40 of this embodiment includes a body portion 44 extending lengthwise between opposed ends. The body portion 44 is typically tubular, but could be other shapes depending upon the shape of the internal openings 28, 32 defined by the first and second shoulder portions 16, 18 since the shape and size of the body portion are typically selected to match the shape and size of the internal openings defined by the first and second shoulder portions. The body portion 44 also defines a lengthwise extending passageway 46 opening through each of the opposed ends. As such, the optical fibers can extend through the passageway 46 defined by the body portion 44 and into the bores 22 defined by the shank 14 of the ferrule 12.

The pin retainer 40 of this embodiment also includes at least one and, more typically, a plurality of engagement members 48 extending laterally outward from the body portion 44 for engaging respective guide pins 30 within the ferrule 12. Typically, the plurality of engagement members 48 extend laterally outward from the body portion 44 by a distance sufficient to be disposed within the circumferential grooves 42 defined by the respective guide pins 30 without contacting the bottom of the grooves. Although the pin retainer 40 could have a single engagement member 48 that extends circumferentially about all or a portion of the body portion 44, the pin retainer generally has the same number of engagement members as the number of guide pins 30. Thus, since the fiber optic connector typically includes a pair of guide pins 30, the pin retainer 40 also commonly includes a pair of engagement members 48 extending laterally outward from opposite sides of the body portion 44 for engaging the circumferential grooves 42 defined by the respective guide pins.

As shown in FIG. 5, the plurality of engagement members 48 generally extend laterally outward from a midpoint of the body portion 44. As such, the pin retainer 40 is symmetrical about an imaginary plane passing through the engagement members 48. As such, either end of the pin retainer 40 can initially be inserted into the internal openings 28, 32 defined by the first and second shoulder portions 16, 18. In an alternative embodiment depicted in FIG. 6, however, each engagement member 48 tapers laterally outward. In this embodiment, each engagement member 48 tapers laterally outward from a first side facing one end of the body portion 44 to a second side facing another end of the body portion. The pin retainer 40 of this embodiment is therefore inserted into the internal openings 28, 32 defined by the first and second shoulder portions 16, 18 such that the engagement member 48 tapers laterally outward in a direction extending from the front face 20 of the ferrule 12 to the rearward end of the ferrule. As such, the tapered engagement member 48 facilitates the insertion of the engagement member into the circumferential groove 42 of a respective guide pin 30. However, the pin retainer 40 of the embodiment of FIG. 5 offers a manufacturing process advantage over that of FIG. 4 since the pin retainer of FIG. 5 is orientation independent.

Figure 6:
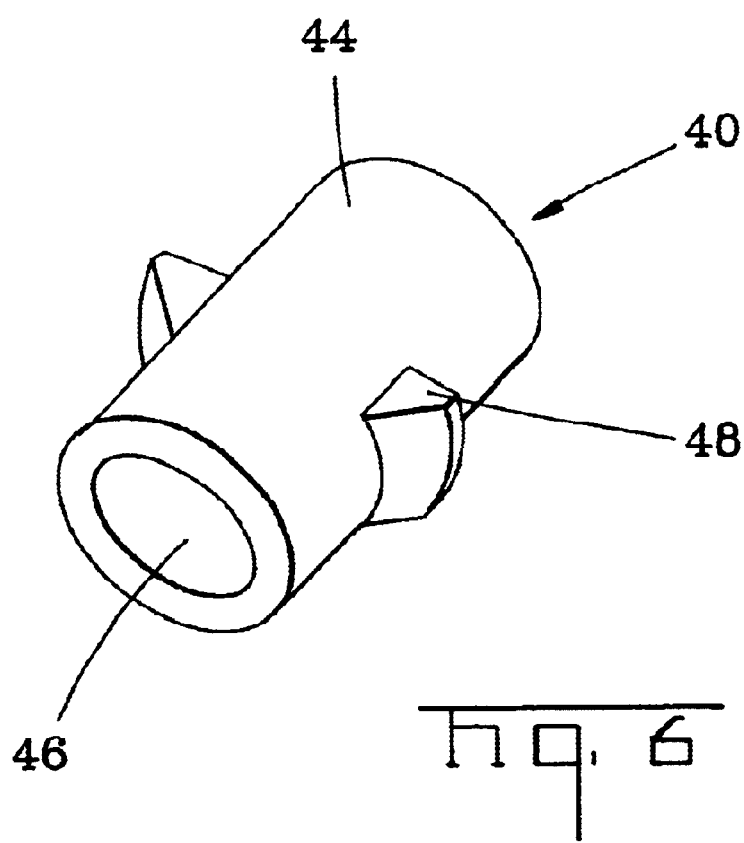
FIG. 6 is a perspective view of a pin retainer according to another embodiment of the present invention.

A fiber optic connector including the pin retainer 40 of FIG. 5 or 6 permits guide pins 30 to be inserted following the assembly of the connector and the polishing of the front face 20 of the ferrule 12. In this regard, the pin retainer 40 is inserted into the internal openings 28, 32 defined by the first and second shoulder portions 16, 18 during the assembly of the fiber optic connector as shown in FIGS. 3 and 4. Typically, the pin retainer 40 is press fit or friction fit within the internal openings of the ferrule 12 and is held within the ferrule by means of an epoxy or the like. However, guide pins 30 are not inserted into the ferrule 12 during the initial assembly of the connector, thereby producing female versions of the connector. In instances in which it is desired to convert the female version of the fiber optic connector into the male version, the guide pins 30 are inserted into respective holes 23, 24 defined by the shank 14 and the first shoulder portion 16 and through the respective grooves 34 defined by the second shoulder portion 18. As the guide pins 30 are advanced through the grooves 42, the end portions of the guide pins contact respective engagement members 48. However, the guide pins 30 preferably include a tapered or frustoconical end portion 50 to facilitate the advancement of the end portions of the guide pins beyond the engagement members 48 of the pin retainer 40. The engagement members 48 of the pin retainer 40 then snap into the circumferential grooves 42 of the respective guide pins 30 so as to securely engage the guide pins and affix the guide pins in position relative to the ferrule 12. Thus, a field technician need not carry both male and female versions of the connector, but can, instead, carry female versions of the connector and a supply of guide pins 30 so as to convert female versions of the connector into male versions in the field, on an as needed basis.

The fiber optic connector of the present invention can include other types of pin retainers 40 for engaging the portions of the plurality of guide pins 30 that extend along the second shoulder portion 18. As described above, however, these alternative embodiments of the pin retainer 40 are also preferably designed to have a size and shape in lateral cross-section that is no larger than the first shoulder portion 16 of the ferrule 12. Additionally, these alternative embodiments of the pin retainer 40 can further be designed so as not to be positioned rearward of the ferrule 12.

Figure 8:
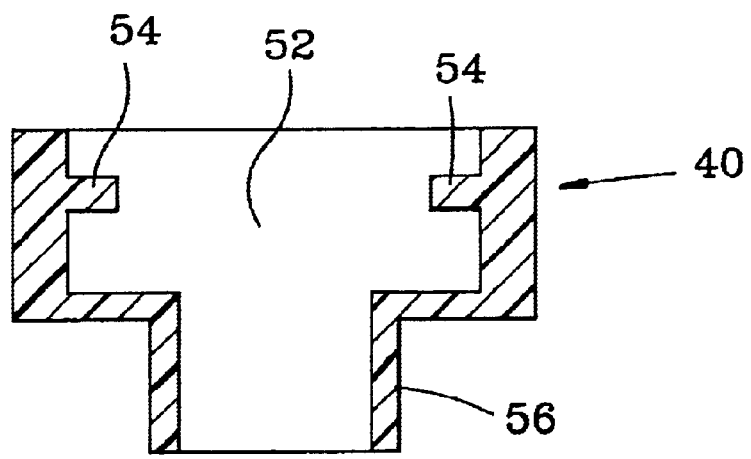
FIG. 8 is a cross-sectional view of the pin retainer of FIG. 7 taken along line 8—8.

These alternative embodiments of the pin retainer 40 can engage the portions of the guide pins 30 that extend along the exterior surface of the second shoulder portion 18. In one alternative embodiment depicted in FIGS. 7 and 8, for example, the pin retainer 40 includes a retainer housing defining an internal opening 52 that is sized and shaped to receive both the second shoulder portion 18 of the ferrule 12 and the portions of the guide pins 30 that extend along the exterior surface of the second shoulder portion. The internal opening defined by the pin retainer 40 also opens through both of the opposed ends of the pin retainer such that optical fibers can extend through the pin retainer and into the internal cavities 28, 32 defined by the first and second shoulder portions 16, 18 and the bores 22 defined by the shank 14. The pin retainer 40 of this embodiment also includes a plurality and, more typically, a pair of tabs 54 extending into the internal opening 52 defined by the pin retainer 40 for engaging the circumferential grooves 42 of respective guide pins 30. Accordingly, the pin retainer 40 of this embodiment can also securely engage the guide pins 30 and affix the guide pins in position relative to the ferrule 12. While the embodiment of this alternative pin retainer 40 depicted in FIGS. 7 and 8 includes a rearward portion 56 having a smaller cross-sectional size that is positioned immediately rearward of the ferrule 12, the pin retainer need not include the rearward portion, but can, instead, include only that portion that extends about the second shoulder portion 18 of the ferrule to reduce the combined length of the ferrule and the pin retainer, if so desired. In any event, however, the pin retainer 40 of this alternative embodiment does not extend laterally outward beyond the first shoulder portion 16.

In another embodiment illustrated in FIG. 9, the pin retainer 40 can include a plurality of clips 58 for engaging respective guide pins 30 that extend along the exterior surface of the second shoulder portion 18. The pin retainer 40 of this embodiment also includes a frame 60 connecting the plurality of clips 58. The frame 60 defines an opening for receiving the second shoulder portion 18 such that the frame can be mounted over the second shoulder portion and the clips 58 can engage the circumferential grooves 42 of respective guide pins 30. However, the frame 60 is advantageously no larger in lateral cross-section than the first shoulder portion 16 of the ferrule 12. Moreover, the pin retainer 40 of this embodiment does not extend rearward of the ferrule 12, thereby permitting the ferrule to be lengthened, if desired, relative to a conventional MT ferrule 12.

As described above, the multi-fiber ferrule 12 of the present invention is compatible with a variety of conventional ferrules including mini-MT ferrules and E-ferrules and, if sized properly, MT ferrules. As such, a fiber optic connector that includes the multi-fiber ferrule can include a wide variety of other components depending upon its type. For purposes of illustration, however, the multi-fiber ferrule 12 and the pin retainer 40 of the embodiment depicted in FIGS. 3–5 will hereinafter be described in conjunction with an MT-RJ connector 65 and a UniCam® connector 35. As will apparent to those skilled in the art, the multi-fiber ferrule 12 and pin retainer 40 of the present invention can also be embodied within an MTP connector in much the same fashion as described hereinbelow in conjunction with the MT-RJ connector 65, although the MT ferrule will be larger than the mini-MT ferrule.

With respect to the embodiment in which the fiber optic connector 65 is an MT-RJ connector, the pin retainer 40 is initially inserted into the internal openings 28, 32 defined by the first and second shoulder portions 16, 18 in order to engage guide pins 30 that will be subsequently inserted to convert the connector to a male version. As shown in cross-section in FIGS. 10 and 11, the connector of this embodiment also includes a lead-in tube 62 that is inserted into the rearwardmost portion of the internal opening defined by the pin retainer 40. The connector 65 also includes a connector boot 64, a crimp band 66, a spring push 68 and a spring 70. The connector 65 further includes a connector housing 72.

During the manufacturing process, the ferrule 12 with lead-in tube 62 is inserted into the housing 72. The spring 70 and spring push 68 are inserted rearward of the ferrule 12 and the spring push tabs 76 are snapped into windows 78 in the housing 72 to secure the assembly. Thus, the product as received by the customer for installation on fiber comprises the housing 72 and the components enclosed within, the crimp ring 66 and the connector boot 64. While the fiber optic connector 65 of this embodiment could utilize the pin retainers 40 of FIGS. 5 and 6, the pin retainer of the illustrated embodiment extends rearwardly of the ferrule 12. In particular, the pin retainer 40 includes a shoulder portion proximate the ferrule and a tubular portion extending rearward therefrom. As such, the forwardmost portion of the spring 70 fits over the tubular portion and abuts the shoulder portion of the pin retainer 40. As such, the pin retainer 40 of the illustrated embodiment also advantageously serves as a spring seat and performs a spring centering function.

In order to subsequently install the fiber optic connector 65 upon a fiber optic cable, the end portions of the optical fibers are stripped of their coatings. Epoxy is then injected into the ferrule 12 through the lead-in tube 62 that protrudes from the back of the spring push 68. The fibers are then inserted through the lead-in tube 62 and ferrule 12 until they protrude from the front of the ferrule. The connector and fiber assembly is then cured in an oven to set the epoxy. By injecting epoxy through the lead-in tube 62, the ferrule 12 of the present invention can be windowless, thereby overcoming limitations with MT ferrules having windows that could not be preassembled since the window had to remain accessible while mounting the ferrule upon the optical fibers in order to inject epoxy into the ferrule. In this regard, reference is made to U.S. patent application Ser. No. 09/464,815 filed Dec. 17, 1999 by David L. Dean, et al. entitled A Windowless, Rectangular Ferrule in a Preassembled Multi-fiber Connector and Associated Assembly Method for more details regarding windowless ferrules and the advantages of preassembly. The contents of U.S. patent application Ser. No. 09/464,815 are hereby incorporated by reference. After curing, cable strain relief yarn may be flared around the spring push 68 and retained in place by crimping crimp band 66 around the spring push. The boot 64 is then slid into place. After this curing and assembly, the fiber optic connector 65 is polished. After polishing, the guide pins 30 may be inserted from the polished end until they engage pin retainer 40 to create a male connector. Thus, the fiber optic connector 65 can be selectively configured as a male connector following the assembly process in the field.

Alternatively, the multi-fiber ferrule 12 of the present invention can be incorporated within a UniCam® connector 35 as depicted in FIGS. 12–14. As before, the pin retainer 40 is initially disposed within the internal openings 28, 32 defined by the first and second shoulder portions 16, 18. Fiber stubs are then disposed within the ferrule 12 and both the pin retainer 40 and the fiber stubs are secured in position relative to the ferrule by means of epoxy. The ferrule 12, complete with fiber stubs, and the pin retainer 40 are then joined with the splice component holder 36, as described above. The splice component holder 36 contains splice components 38, and lead-in tube 90. The lead-in tube 90 is secured by means of epoxy or the like, whereas the splice components 38 are located within a cavity in the splice component holder 36. The front face 20 of the ferrule and the ends of the optical fibers are then polished. The connector 35 also includes several other components including a spring 80, a spring push 82, a cam member 84, and a connector boot.

The connector 35 also includes a connector housing 86 in which the ferrule 12 is disposed. As mentioned above, the splice component holder 36, including the splice components 38 and the lead-in tube 90, is joined with the ferrule 12 and extends rearward of the connector housing 86. The connector housing 86 typically includes a ledge 88 that projects inwardly into the internal cavity defined by the connector housing for engaging the shoulder 26 defined by the first shoulder portion 16, thereby retaining the ferrule 12 and the components attached to the ferrule. The spring 80 is then slid over the splice component housing 36. The spring push 82 is then slidably advanced over the splice component housing 36 and tabs 92 are engaged into the windows 94 defined by the connector housing 86 so as to secure the components inside the connector housing. As shown, the spring 80 is designed to provide a forward bias force to the splice component holder 36 which in turn, applies a forward bias force to the ferrule 12.

The cam member 84 is then slidably advanced over the splice component holder 36 such that the splice components 38 are not actuated, i.e., the splice components are not forced tightly together. In this regard, the splice component holder 36 preferably defines a lengthwise extending passageway that opens through both of the opposed ends thereof. The portion of the passageway proximate the ferrule 12 is preferably sized and shaped to snugly receive the second shoulder portion 18 of the ferrule, thereby joining the ferrule and the splice component holder 36. As such, the splice component holder 36 and the ferrule 12 are maintained in an aligned, mechanically engaged relationship. The end portions of the field fibers are then inserted through the lead-in tube 90 and into respective grooves defined by the splice components 38 until the end portions of the filed fibers abut the corresponding fiber stubs. The cam member 84 is then rotated so as to activate the splice components 38, thereby urging the splice components toward one another in order to mechanically splice the field fibers and the fiber stubs. A connector boot is slidably advanced over the rearward portion of the splice component holder 36 to complete the assembly of the UniCam® connector 35.

As will be apparent from the foregoing examples, the ferrule 12 of the present invention is compatible with the mini-MT ferrule and the E-ferrule, thereby providing a common ferrule that can replace both styles of ferrules. Thus, the number of different styles of ferrules that must be manufactured and maintained in inventory can be reduced. Moreover, it should be understood that the ferrule 12 of the present invention may be sized to be compatible with MT ferrules, if so desired. In addition, the ferrule 12 of the present invention is capable of receiving guide pins 30 following the assembly of the fiber optic connector 35, 65 and the polishing of the front face 20 of the ferrule by inserting guide pins through the holes 23 defined by the shank 14 and into engagement with the engagement members 48 of the pin retainer 40. Thus, female versions of the fiber optic connector 35, 65 can be converted into male versions in the field, thereby reducing the number of different connectors that must be carried by a field technician.

Figure 15:
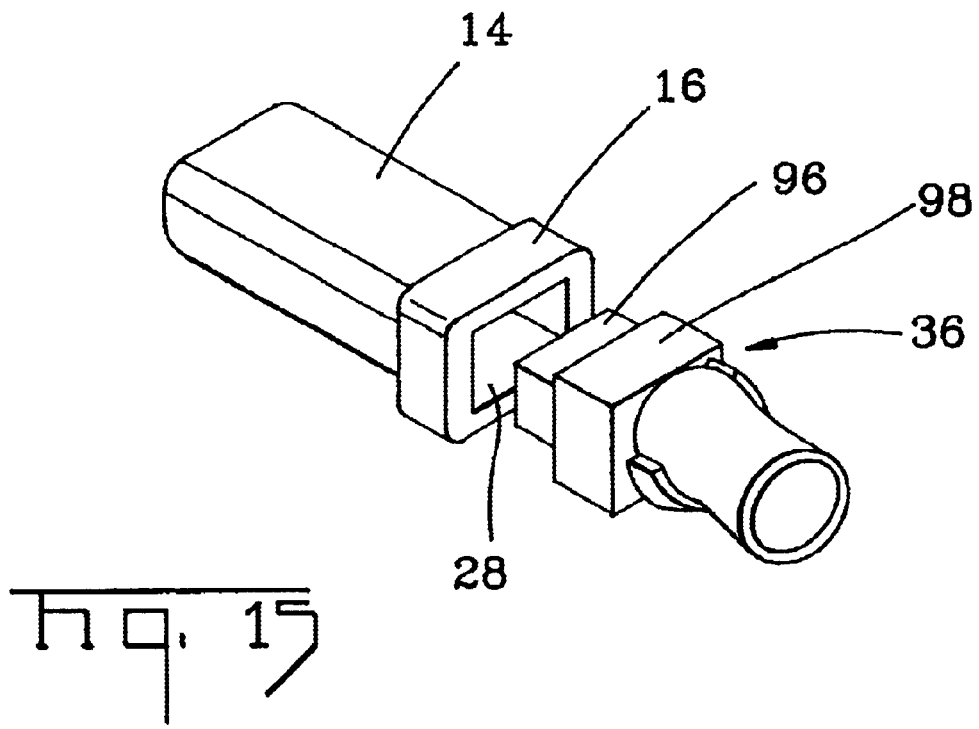
FIG. 15 is a perspective view of a ferrule and a splice component holder according to another embodiment of the present invention.
Figure 16:
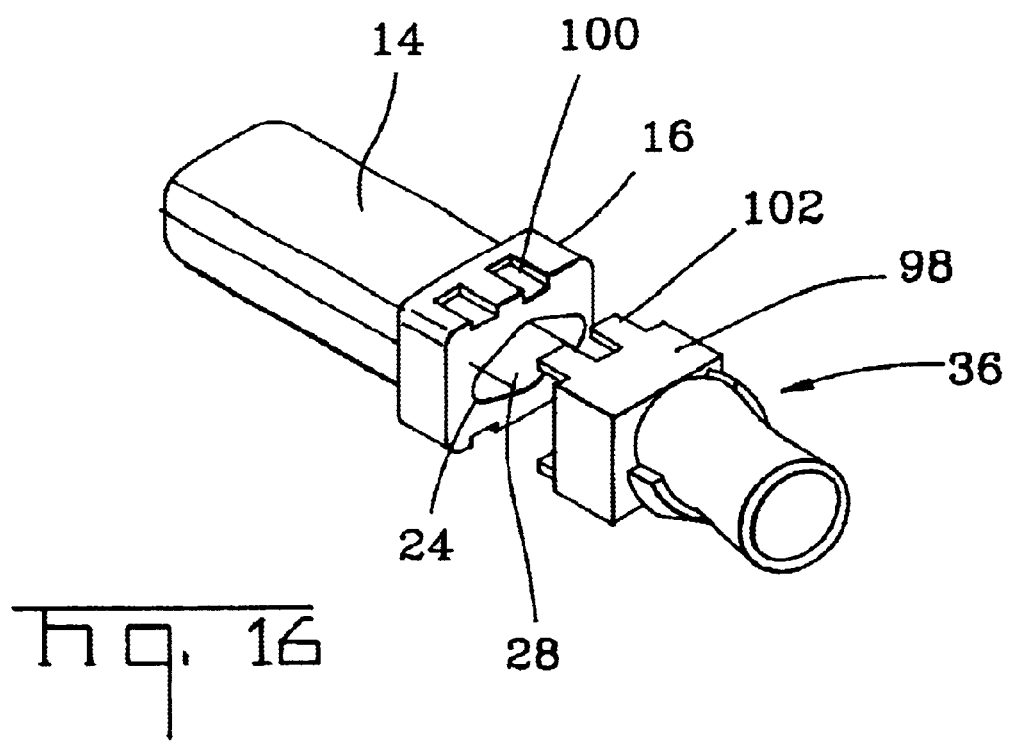
FIG. 16 is a perspective view of a ferrule and a splice component holder according to yet another embodiment of the present invention.

One embodiment of a ferrule 12 and a splice component holder 36 has been described in detail above. However, the fiber optic connector of the present invention can include ferrules and splice component holders having other configurations, if so desired. As depicted in FIGS. 15 and 16, for example, fiber optic connectors of other embodiments also include a ferrule having a shank 14 defining at least one lengthwise extending bore for receiving an end portion of a respective optical fiber and a first shoulder portion 16 proximate the rearward end of the shank. The first shoulder portion 16 has a cross-sectional profile that is larger than the shank 14 in order to define a shoulder 26 for engaging an inwardly protruding feature, such as a ledge, of a connector housing in order to permit the ferrule to be retained within the connector housing as described above. As also illustrated in FIGS. 15 and 16, the fiber optic connector includes a splice component holder 36 extending lengthwise between opposed first and second ends. The first end 96 of the splice component holder 36 engages the first shoulder portion 16 of the ferrule 12 such that the splice component holder and the ferrule are maintained in an aligned relationship. According to these embodiments, the splice component holder 36 engages the first shoulder portion such that the engaged portions of the splice component and the first shoulder portion 16 have a combined cross-sectional profile that is no larger and, typically, is equal to the cross-sectional profile of the first shoulder portion. As such, the combination of the ferrule 12 and the splice component holder 36 does not require that the internal cavity defined by the connector housing be enlarged relative to the internal cavity defined by conventional connector housings.

The first shoulder portion 16 of the ferrule 12 defines an internal opening 28 in communication with the bores 22 defined by the shank 14. According to the embodiment depicted in FIG. 15, the first end 96 of the splice component holder 36 is sized and shaped to be snugly received within the internal opening 28 defined by the first shoulder portion 16 of the ferrule 12. As such, the ferrule 12 and the splice component holder 36 are engaged in an aligned relationship. According to this embodiment, the splice component holder 36 also preferably includes a shoulder portion 98 proximate the first end of the splice component holder that is larger in lateral cross-section than the first end of the splice component holder. In this regard, the shoulder portion 98 of the splice component holder 36 and the first shoulder portion 16 of the ferrule 12 preferably have the same size and shape in lateral cross-section.

According to another embodiment illustrated in FIG. 16, the first shoulder portion 16 of the ferrule 12 defines a plurality of lengthwise extending channels 100, such as a pair of lengthwise extending channels, along each of the longer sides of the first shoulder portion. According to this embodiment, the first end of the splice component holder 36 has a castellated configuration and includes a plurality of lengthwise extending tabs 102 for engaging respective channels 100 of the first shoulder portion 16. As such, the ferrule 12 and the splice component holder 36 of this embodiment are also engaged in an aligned relationship. As depicted in FIG. 16 and as described above, the splice component holder 36 of this embodiment can also include a shoulder portion 98. The first shoulder portion 16 of the ferrule can also define an internal opening that is designed to receive a pin retainer 40 in the same manner as described in conjunction with and illustrated by FIG. 3. As such, guide pins can be inserted through respective holes defined by the shank and the first shoulder portion 16 of the ferrule 12 for engagement by the pin retainer 40.

As the foregoing embodiments illustrate, the fiber optic connector of the present invention includes various embodiments of ferrules 12 and splice component holders 36. In each embodiment, the multi-fiber ferrule 12 and the splice component holder 36 engage with one another in an aligned relationship with the resulting combination extending no further laterally outward than the first shoulder portion 16 of the ferrule 12, thereby permitting the ferrule and the splice component holder of any of the various embodiments to be disposed within connector housings of a standard size and profile.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multifiber ferrule comprising:
   a shank extending lengthwise between opposed first and second ends, said shank comprising a front face proximate the first end, said shank defining a plurality of lengthwise extending bores opening through the front face for receiving end portions of respective optical fibers, said shank also defining a plurality of lengthwise extending holes opening through the front face for receiving respective guide pins;
   a first shoulder portion proximate the second end of said shank, said first shoulder portion being larger in lateral cross-section than said shank; and
   a second shoulder portion proximate said first shoulder portion and disposed opposite said shank relative to said first shoulder portion, said second shoulder portion being smaller in lateral cross-section than said first shoulder portion for receiving a pin retainer such that said second shoulder portion and the pin retainer define a lateral cross-section tat is no larger than the lateral cross-section of said first shoulder portion,
   wherein both said first and second shoulder portions define respective openings in communication with the plurality of bores for receiving end portions of the optical fibers.

2. A multifiber ferrule according to claim 1 wherein said first shoulder portion defines a plurality of lengthwise extending holes in communication with the holes defined by said shank for receiving respective guide pins.

3. A multifiber ferrule according to claim 1 wherein said second shoulder portion defines a plurality of lengthwise extending grooves in alignment with the holes defined by said shank for receiving respective guide pins.

4. A multifiber ferrule according to claim 3 wherein the plurality of grooves open internally into the opening defined by said second shoulder portion.

5. A multifiber ferrule according to claim 3 wherein the plurality of grooves open through an exterior surface of said second shoulder portion.

6. A pin retainer for engaging a plurality of guide pins within a ferrule, the pin retainer comprising:
   a body portion extending lengthwise between opposed ends, said body portion defining a lengthwise extending passageway opening through each of the opposed ends, said body portion being sized to be at least partially received within an opening defined by the ferrule; and
   at least one engagement member extending laterally outward from said body portion for engaging respective guide pins within the ferrule.

7. A pin retainer according to claim 6 wherein said at least one engagement member comprises a pair of engagement members extending laterally outward from opposite sides of said body portion.

8. A pin retainer according to claim 6 wherein said at least one engagement member extends laterally outward from a midpoint of said body portion such that the pin retainer is symmetrical about an imaginary plane passing through said at least one engagement member.

9. A pin retainer according to claim 6 wherein said body portion is cylindrical.

10. A pin retainer according to claim 6 wherein each engagement member tapers laterally outward from a first side facing one end of said body portion to a second side facing another end of said body portion.

11. A pin retainer according to claim 6 wherein said body portion includes a shoulder portion and a tubular portion extending outwardly therefrom proximate one end thereof, and wherein the shoulder portion is larger in lateral cross-section than the tubular portion.

12. A fiber optic connector comprising:
    a ferrule comprising:
      a shank defining a plurality of lengthwise extending bores for receiving end portions of respective optical fibers, said shank also defining a plurality of lengthwise extending holes for receiving respective guide pins;
      a first shoulder portion proximate one end of said shank, said first shoulder portion being larger in lateral cross-section than said shank, said first shoulder portion also defining a plurality of lengthwise extending holes for receiving respective guide pins; and
      a second shoulder portion proximate said first shoulder portion and disposed opposite said shank relative to said first shoulder portion, said second shoulder portion being smaller in lateral cross-section than said first shoulder portion;
    a plurality of guide pins extending through respective holes defined by said shank and said first shoulder portion, said plurality of guide pins extending lengthwise beyond said first shoulder portion and along said second shoulder portion; and
    a pin retainer for engaging the portions of said plurality of guide pins that extend along said second shoulder portion;
    wherein said second shoulder portion receives said pin retainer such that said second shoulder portion and said pin retainer define a lateral cross-section that is no larger than the lateral cross-section of said first shoulder portion.

13. A fiber optic connector according to claim 12 wherein said second shoulder portion defines an opening in communication with the boles defined by said first shoulder portion, wherein said plurality of guide pins extend at least partially through the opening defined by said second shoulder portion, and wherein said pin retainer is sized and shaped to be at least partially disposed within the opening defined by said second shoulder portion and to engage portions of said plurality of guide pins therewithin.

14. A fiber optic connector according to claim 13 wherein said pin retainer comprises:
    a body portion extending lengthwise between opposed ends, said body portion defining a lengthwise extending passageway opening through each of the opposed ends; and
    at least one engagement member extending laterally outward from said body portion for engaging respective guide pins.

15. A fiber optic connector according to claim 14 wherein said at least one engagement member comprises a pair of engagement members extending laterally outward from opposite sides of said body portion for engaging a pair of guide pins.

16. A fiber optic connector according to claim 14 wherein each guide pin defines a circumferential groove, and wherein said at least one engagement member engages the circumferential groove of respective guide pins.

17. A fiber optic connector according to claim 13 wherein said second shoulder portion defines a plurality of lengthwise extending grooves in alignment with the holes defined by said shank and said first shoulder portion for receiving respective guide pins, and wherein the plurality of grooves open internally into the opening defined by said second shoulder portion.

18. A fiber optic connector according to claim 12 wherein said plurality of guide pins extend along an exterior surface of said second shoulder portion.

19. A fiber optic connector according to claim 18 wherein said second shoulder portion defines a plurality of lengthwise extending grooves in alignment with the holes defined by said shank and said first shoulder portion for receiving respective guide pins, and wherein the plurality of grooves open through an exterior surface of said second shoulder portion.

20. A fiber optic connector comprising:
   a ferrule comprising:
      a shank defining a plurality of lengthwise extending bores for receiving end portions of respective optical fibers, said shank also defining a plurality of lengthwise extending holes for receiving respective guide pins;
      a first shoulder portion proximate one end of said shank, said first shoulder portion being larger in lateral cross-section than said shank, said first shoulder portion also defining a plurality of lengthwise extending holes for receiving respective guide pins; and
      a second shoulder portion proximate said first shoulder portion and disposed opposite said shank relative to said first shoulder portion, said second shoulder portion being smaller in lateral cross-section than said first shoulder portion;
   a plurality of guide pins extending through respective holes defined by said shank and said first shoulder portion, end portions of said plurality of guide pins extending lengthwise beyond said first shoulder portion and along an exterior surface of said second shoulder portion; and
   a pin retainer for engaging the portions of said plurality of guide pins tat extend along the exterior surface of said second shoulder portion, said pin retainer defining an opening sized and shaped to receive said second shoulder portion and the end portions of said plurality of guide pins such that the end portions of said plurality of guide pins are engaged between said pin retainer and said second shoulder portion.

21. A fiber optic connector according to claim 20 wherein each guide pin defines a circumferential groove, and wherein said pin retainer comprises a plurality of tabs extending into the opening defined by said pin retainer for engaging the circumferential groove of respective guide pins.

22. A fiber optic connector comprising:
   a ferrule comprising:
      a shank defining a plurality of lengthwise extending bores for receiving end portions of respective optical fibers, said shank also defining a plurality of lengthwise extending holes for receiving respective guide pins;
      a first shoulder portion proximate one end of said shank, said first shoulder portion being larger in lateral cross-section than said shank, said first shoulder portion also defining a plurality of lengthwise extending holes for receiving respective guide pins; and
      a second shoulder portion proximate said first shoulder portion and disposed opposite said shank relative to said first shoulder portion, said second shoulder portion being smaller in lateral cross-section than said first shoulder portion;
   a plurality of guide pins extending through respective holes defined by said shank and said first shoulder portion, end portions of said plurality of guide pins extending lengthwise beyond said first shoulder portion and along an exterior surface of said second shoulder portion; and
   a pin retainer for engaging the portions of said plurality of guide pins that extend along the exterior surface of said second shoulder portion, said pin retainer comprising a plurality of clips for engaging respective guide pins proximate said second shoulder portion.

23. A fiber optic connector according to claim 22 wherein said pin retainer further comprises a frame connecting said plurality of clips, wherein said frame defines an opening for receiving said second shoulder portion and is no larger in lateral cross-section than said first shoulder portion.

24. A fiber optic connector comprising:
   a ferrule comprising:
      a shank defining at least one lengthwise extending bore for receiving an end portion of a respective optical fiber and a plurality of lengthwise extending holes for receiving respective guide pins;
      a first shoulder portion proximate one end of said shank, said first shoulder portion defining a plurality of lengthwise extending holes for receiving respective guide pins and having a cross-sectional profile tat is larger than said shank; and
      a second shoulder portion proximate said first shoulder portion and disposed opposite said shank relative to said first shoulder portion, said second shoulder portion being smaller in lateral cross-section than said first shoulder portion;
   a splice component holder extending lengthwise between opposed first and second ends, said splice component holder defining a lengthwise extending passageway that opens through the first end, wherein a portion of the passageway proximate to first end of said splice component holder is sized and shaped to snugly receive said second shoulder portion of said ferrule such that said splice component holder and said ferrule are maintained in an aligned relationship;
   a plurality of guide pins extending trough the respective holes defined by said shank and said first shoulder portion, portions of said plurality of guide pins extending lengthwise beyond said first shoulder portion and along said second shoulder portion; and
   a pin retainer for engaging to portions of said plurality of guide pins that extend along said second shoulder portion.

25. A fiber optic connector according to claim 24 wherein said second shoulder portion defines an opening in communication with the bores defined by said first shoulder portion, wherein said plurality of guide pins extend at least partially through the opening defined by said second shoulder portion, and wherein said pin retainer is sized and shaped to be at least partially disposed within the opening defined by said second shoulder portion and to engage portions of said plurality of guide pins therewithin.

26. A fiber optic connector according to claim 25 wherein said pin retainer comprises:
   a body portion extending lengthwise between opposed ends, said body portion defining a lengthwise extending passageway opening through each of the opposed ends; and at least one engagement member extending laterally outward from said body portion for engaging respective guide pins.

27. A fiber optic connector according to claim 26 wherein said at least one engagement member comprises a pair of engagement members extending laterally outward from opposite sides of said body portion for engaging a pair of guide pins.

28. A fiber optic connector according to claim 27 wherein each guide pin defines a circumferential groove, and wherein said at least one engagement member engages the circumferential groove of respective guide pins.

29. A fiber optic connector according to claim 24 wherein said second shoulder portion defines a plurality of lengthwise extending grooves in alignment with the holes defined by said shank and said first shoulder portion for receiving respective guide pins, and wherein the plurality of grooves open internally into the opening defined by said second shoulder portion.

30. A fiber optic connector comprising:
   a ferrule comprising:
      a shank defining at least one lengthwise extending bore for receiving an end portion of a respective optical fiber; and
      a first shoulder portion proximate one end of said shank, said first shoulder portion defining a plurality of lengthwise extending channels and having a cross-sectional profile that is larger than said shank; and
   a splice component holder extending lengthwise between opposed first and second ends, wherein the first end of said splice component holder engages said first shoulder portion of said ferrule such that said splice component holder and said ferrule are maintained in an aligned relationship, the first end of said splice component holder comprising a plurality of lengthwise extending tabs for engaging respective channels of said first shoulder portion, said splice component holder engaging said first shoulder portion such that the engaged portions of said splice component holder and said first shoulder portion have a combined cross-sectional profile that is no larger than the cross-sectional profile of said first shoulder portion.

31. A fiber optic connector according to claim 30 wherein said first shoulder portion of said ferrule defines an opening in communication with the at least one lengthwise extending bore defined by said shank, and wherein the first end of the splice component holder is sized and shaped to be snugly received within the opening defined by said first shoulder portion of said ferrule.

32. A fiber optic connector according to claim 31 wherein said splice component holder comprises a shoulder portion proximate the first end of said splice component holder and being larger in lateral cross-section than the first end of said splice component holder.

33. A fiber optic connector according to claim 32 wherein the shoulder portion of said splice component holder and the first shoulder portion of said ferrule have the same size and shape in lateral cross-section.

34. A fiber optic connector according to claim 30 further comprising a plurality of splice components disposed within said splice component holder for facilitating a mechanical splice of the optical fiber upon which said shank is mounted and another optical fiber.

35. A fiber optic connector comprising:
   a ferrule comprising:
      a shank defining a plurality of lengthwise extending bores for receiving end portions of respective optical fibers, said shank also defining a plurality of lengthwise extending holes for receiving respective guide pins;
      a first shoulder portion proximate one end of said shank, said first shoulder portion being Larger in lateral cross-section than said shank, said first shoulder portion also defining a plurality of lengthwise extending holes for receiving respective guide pins; and
      a second shoulder portion proximate said first shoulder portion and disposed opposite said shank relative to said first shoulder portion, said second shoulder portion being smaller in lateral cross-section than said first shoulder portion, said second shoulder portion defining an opening in communication with the holes defined by said first shoulder portion;
   a plurality of guide pins extending through respective holes defined by said shank and said first shoulder portion, said plurality of guide pins extending lengthwise beyond said first shoulder portion and along said second shoulder portion at least partially through the opening defined by said second shoulder portion; and
   a pin retainer for engaging the portions of said plurality of guide pins that extend along said second shoulder portion, said pin retainer being sized and shaped to be at least partially disposed within the opening defined by said second shoulder portion and to engage portions of said plurality of guide pins therewithin.

36. A fiber optic connector comprising:
   a ferrule comprising:
      a shank defining at least one lengthwise extending bore for receiving an end portion of a respective optical fiber;
      a first shoulder portion proximate one end of said shank, said first shoulder portion having a cross-sectional profile that is larger than said shank; and
      a second shoulder portion proximate said first shoulder portion and disposed opposite said shank relative to said first shoulder portion, said second shoulder portion being smaller in lateral cross-section than said first shoulder portion for receiving a pin retainer such that said second shoulder portion and the pin retainer define a lateral cross-section that is no larger than the lateral cross-section of said first shoulder portion; and
   a splice component holder extending lengthwise between opposed first and second ends, said splice component holder defining a lengthwise extending passageway that opens through the first end, wherein a portion of the passageway proximate the first end of said splice component holder is sized and shaped to snugly receive said second shoulder portion of said ferrule such that said splice component holder and said ferrule are maintained in an aligned relationship.

37. A fiber optic connector comprising:
   a ferrule comprising:
      a shank defining at least one lengthwise extending bore for receiving an end portion of a respective optical fiber;
      a first shoulder portion proximate one end of said shank, said first shoulder portion having a cross-sectional profile that is larger than said shank; and
      a second shoulder portion proximate said first shoulder portion and disposed opposite said shank relative to said first shoulder portion, said second shoulder portion being smaller in lateral cross-section than said first shoulder portion for receiving a pin retainer such that said second shoulder portion and the pin retainer define a lateral cross-section that is no larger tan the lateral cross-section of said first shoulder portion; and a splice component holder extending lengthwise between opposed first and second ends, wherein the first end of said splice component holder engages said first shoulder portion of said ferrule such that said splice component holder and said ferrule are maintained in an aligned relationship, said splice component holder engaging said first shoulder portion such that the engaged portions of said splice component and said first shoulder portion have a combined cross-sectional profile that is no larger than the cross-sectional profile of said first shoulder portion.

* * * * *

UNITED STATES PATENT AND TRADEMARK OFFICE
CERTIFICATE OF CORRECTION

PATENT NO. : 6,669,377 B2
DATED : December 30, 2003
INVENTOR(S) : Brandon A. Barnes et al.

It is certified that error appears in the above-identified patent and that said Letters Patent is hereby corrected as shown below:

<u>Column 17,</u>
Line 24, delete "tat" and substitute -- that --.

<u>Column 18,</u>
Line 41, delete "boles" and substitute -- holes --.

<u>Column 19,</u>
Line 41, delete "tat" and substitute -- that --

<u>Column 20,</u>
Line 29, delete "tat" and substitute -- that --

<u>Column 22,</u>
Line 5, delete "Larger" and substitute -- larger --.

<u>Column 23,</u>
Line 4, delete "tan" and substitute -- than --.

Signed and Sealed this

Third Day of February, 2004

JON W. DUDAS
*Acting Director of the United States Patent and Trademark Office*